United States Patent [19]

Aberson, Jr. et al.

[11] Patent Number: 5,125,057
[45] Date of Patent: Jun. 23, 1992

[54] OPTICAL FIBER SPLICING DEVICE

[75] Inventors: James A. Aberson, Jr., Atlanta; Scott T. Davies, Norcross; George F. DeVeau, Stone Mountain; Joseph K. Lo, Atlanta, all of Ga.

[73] Assignee: AT&T Bell Laboratories, Murray Hill, N.J.

[21] Appl. No.: 682,888

[22] Filed: Apr. 8, 1991

Related U.S. Application Data

[63] Continuation of Ser. No. 439,747, Nov. 20, 1989, abandoned.

[51] Int. Cl.⁵ ............................................. G02B 6/38
[52] U.S. Cl. .................................... 385/65; 385/137; 385/136; 385/66; 385/68
[58] Field of Search ..................... 350/96.2, 96.21; 385/58, 60, 65, 66, 68, 136, 137

[56] References Cited

U.S. PATENT DOCUMENTS

| | | | |
|---|---|---|---|
| 4,545,644 | 10/1985 | De Veau, Jr. et al. | 350/96.21 |
| 4,691,986 | 9/1987 | Aberson, Jr. et al. | 350/96.21 |
| 4,755,018 | 7/1988 | Heng et al. | 350/96.21 |
| 4,784,456 | 11/1988 | Smith | 350/96.21 |
| 4,818,055 | 3/1989 | Patterson | 350/96.2 |
| 4,824,197 | 4/1989 | Patterson | 350/96.21 |
| 4,850,670 | 7/1989 | Mathis et al. | 350/96.21 |
| 4,856,866 | 8/1989 | Freeman et al. | 350/96.21 |
| 4,871,227 | 10/1989 | Tilse | 350/96.21 |
| 4,889,405 | 12/1989 | Walker et al. | 350/96.21 |

FOREIGN PATENT DOCUMENTS

| | | |
|---|---|---|
| 44074 | 2/1979 | Australia . |
| 0146471 | 12/1984 | European Pat. Off. . |
| 171664 | 7/1985 | European Pat. Off. . |
| 244225 | 4/1987 | European Pat. Off. . |
| 0290188 | 4/1988 | European Pat. Off. . |
| 2525132 | 5/1976 | Fed. Rep. of Germany . |
| 2586824 | 9/1985 | France . |
| 52-64942 | 5/1977 | Japan ............................... 350/96.21 |
| 58-105115 | 6/1983 | Japan . |
| 61-7813 | 1/1986 | Japan ............................... 350/96.21 |
| 61-134710 | 6/1986 | Japan ............................... 350/96.21 |
| 221322 | 1/1990 | United Kingdom . |

*Primary Examiner*—John D. Lee
*Assistant Examiner*—John Ngo
*Attorney, Agent, or Firm*—E. W. Somers

[57] ABSTRACT

An optical fiber splicing device (20) includes a glass cylindrically shaped capillary tube member (24) having a passageway formed therethrough eccentrically of the longitudinal axis of the capillary tube member. The capillary tube member is provided with a slot (86) such that a portion of the passageway in the form of a groove (88) extends across a planar surface (87) formed by the slot. The capillary tube member is mounted in a housing (22) which is made of a material and formed to provide a lens opposite to the slot to facilitate visual inspection of ends of end portions of two optical fibers which are positioned in the groove. A spring clamp (26) is mounted to the housing in a first position spaced from the planar surface to allow insertion of fiber end portions into the groove. The clamp is moveable to a second position where it is secured to the housing in a position which causes a portion of the clamp to engage the fiber end portions along at least a portion of the planar surface to hold the fiber end portions in secured alignment with each other.

19 Claims, 4 Drawing Sheets

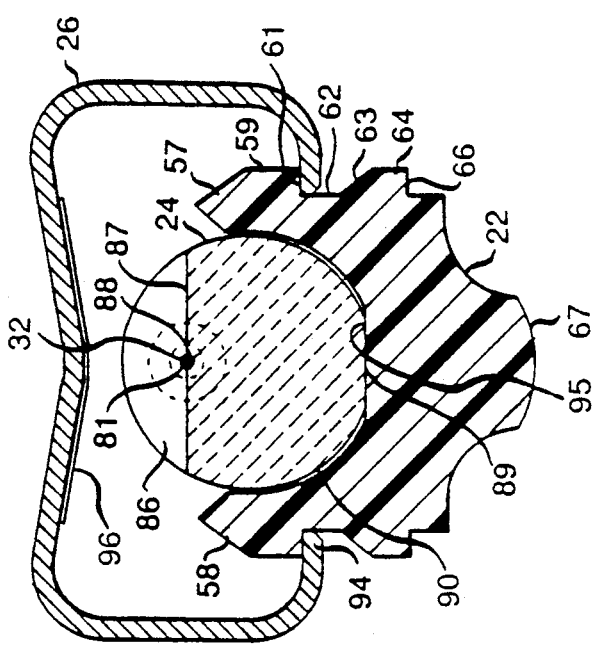
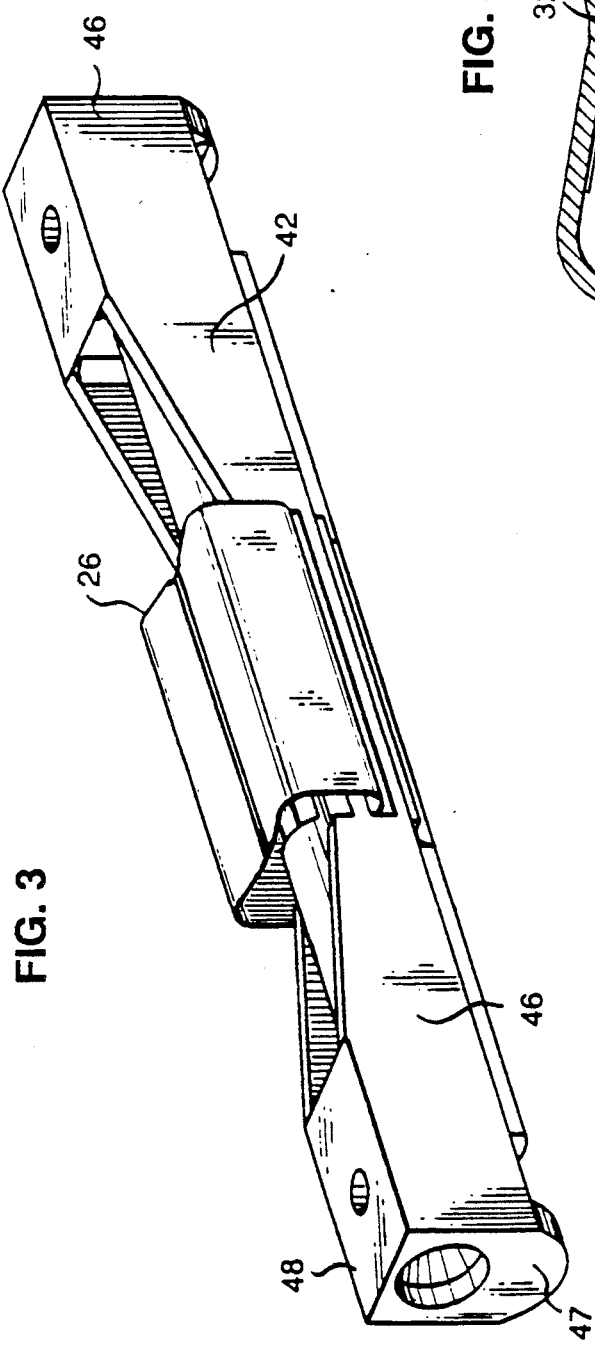

OPTICAL FIBER SPLICING DEVICE

This application is a continuation of application Ser. No. 07/439,747, filed on NOV. 20, 1989 abandoned.

TECHNICAL FIELD

This invention relates to an optical fiber splicing device. More particularly, the invention relates to a splicing device in which end portions of two optical fibers to be spliced are clamped in fixed positions in a slotted capillary tube.

BACKGROUND OF THE INVENTION

Optical fiber connectors and splicing devices are an important part of substantially any optical fiber communication systems. For instance, connectors or splicing devices may be used to join segments of fiber into longer lengths or to connect fiber to active devices such as radiation sources, detectors, or repeaters, or to passive devices such as switches or attenuators. Considering that a core of multimode optical fiber is 50 microns in diameter and that of single mode fiber is 8 microns, the connection or splicing is no small task.

An optical fiber connector is disclosed in U.S. Pat. No. 4,850,670 which issued on Jul. 25, 1989 in the names of T. D. Mathis and C. M. Miller, and which is assigned to the assignee of the instant application. The above patent discloses an optical fiber connector that utilizes two drawn glass capillary tubes that serve to hold two fiber end portions and allow alignment of the ends by means of a simple alignment sleeve. These capillary tubes commonly are referred to also as ferrules. The disclosed connector serves completely satisfactorily with multimode fibers, for which, due to their relatively large core diameter, alignment to within a few microns is generally acceptable. The connector also has been found frequently to give satisfactory results with single-mode fibers. However, it is not always easy to achieve very low-loss connections, that is, connections having a loss of the order of 0.1 dB.

The making of single-mode connections in the prior art typically has involved the active alignment of the fiber ends. Prior art methods comprise translating one fiber end relative to the other, typically by means of a precision stage, until maximum energy coupling across a gap therebetween is observed, for example, by means of a remote detector. As will be appreciated, such a procedure is both difficult to carry out in the field and requires highly skilled personnel.

Drawn glass or other ferrule-type fiber connectors and splicing devices generally offer low cost, simplicity, relatively low-loss single-mode connections, environmental stability, and versatility. Because of these advantages, a connector or splicing device that includes a capillary tube drawn from glass or other material would be of considerable importance.

A somewhat recent entry into the field of optical fiber splicing devices is one which commonly is referred to as the rotary splice. The splicing device is disclosed in U.S. Pat. No. 4,545,644 which issued on Oct. 8, 1985 in the names of G. F. DeVeau, Jr. and C. M. Miller. The rotary splice device comprises two capillary tubes, and preferably three alignment rods consisting preferably of the same material as the capillary tubes in fixed radial and axial relationship to each other. The alignment rods are of generally cylindrical shape, with typically two of them including a flat that is to extend from one end over a substantial fraction of the length of the rod. It is the presence of these, suitably placed, flats which allows alignment of the fiber ends to within exceedingly close tolerances.

Notwithstanding the availability of the above-described splicing device, the search for a reliable optical fiber splicing device has continued. Sought after is a splicing device that is relatively simply and easily installed in the field, that is rugged, and that has acceptable temperature cyclability. Also, the sought-after splicing device should be one which provides a connection having a loss which is sufficiently low to obviate the need for expensive precision alignment apparatus. Further, it has long been desired to provide a relatively low cost optical fiber splicing device for general usage. Also, the splices which are achieved with many of the prior art devices require the use of adhesive materials or gels which require curing. It would be most desirable to have available a mechanical splice which does not require the use of materials to be cured.

A more recently developed optical fiber splicing device is one which is described as cleave, sleeve and leave. In it, end portions of optical fibers are caused to be disposed in a capillary tube with center portions exposed. A flexible metallic member in the center of the capillary tube is folded over the spliced end portions to retain the spliced portions in engagement with each other.

There is another feature which is desired in the sought-after splicing device. Considering the dimensions of the transmission media to be spliced, it would be highly desirable to be able to inspect the spliced ends of the optical fibers without the need for expensive apparatus. A splicing device which includes this feature does not appear to be available in the prior art.

What is desired and seemingly what is not available in the prior art is a relatively low cost, mechanical optical fiber splicing device which does not involve curable materials and which allows inspection of the spliced ends of the optical fibers. The sought-after splicing device should be one which is simplistic in structure yet one which provides a reliable relatively low loss and relatively low return loss splice connection.

SUMMARY OF THE INVENTION

The foregoing problems of the prior art have been overcome with an optical fiber splicing device of this invention. The optical fiber splicing device of this invention comprises a unipurtite tubular member hereinafter referred to as a capillary tube having a longitudinal centerline axis and a passageway formed therethrough for holding end portions of optical fibers to be spliced. The capillary tube has a slot formed therein with a groove portion of the passageway extending across a planar surface formed by the slot. The passageway is formed parallel to the longitudinal centerline axis. In a preferred embodiment, the passageway in formed eccentrically with respect to the longitudinal centerline axis and the slot is formed between the axis of the passageway and the most adjacent outer peripheral surface of the capillary tube.

Also, the splicing device includes energy storage means adapted to be mounted in an open position with respect to the capillary tube. In such position, the energy storage means is spaced from the end portions of the optical fibers which are disposed in the groove which extends across the planar surface formed by the slot. The energy storage means is movable to a closed, second position in which it is secured in clamping engagement with the end portions of the fibers disposed in the groove which opens to the planar surface formed by the slot.

Further, the optical fiber splicing device includes a housing for holding the capillary tube. The housing is provided with portions which cooperate with portions of the energy storage means to hold the energy storage means in clamping engagement with the end portions of the optical fibers.

In a preferred embodiment, the energy storage means comprises a spring clamp having side portions which engage with side portions of the housing. An underside of the spring clamp is provided with a compliant material. When the spring clamp is moved to the closed position, the compliant material becomes disposed in compressive engagement with the exposed end portions of the optical fibers. The spring clamp is effective to prevent damage to the exposed end portions of the optical fibers.

Advantageously, the housing is made of a transparent material and an underside of the housing is arcuately shaped. The interface between the held capillary tube and the transparent housing is index-matched to facilitate the creation of a lensing effect from the cooperation of the arcuately shaped housing portion and the capillary tube which in a preferred embodiment is cylindrically shaped. As a result of this configuration, a craftsperson viewing the underside of the housing may inspect the splice connection.

BRIEF DESCRIPTION OF THE DRAWING

Other features of the present invention will be more readily understood from the following detailed description of specific embodiments thereof when read in conjunction with the accompanying drawings, in which:

FIG. 3 is a perspective view of the optical fiber splicing device of FIG. 1 as assembled with the spring clamp thereof in an open position;

FIG. 5 is an end view in section of the optical fiber splicing device of FIG. 3 with the spring clamp thereof in an open position;

DETAILED DESCRIPTION

Figure 1:
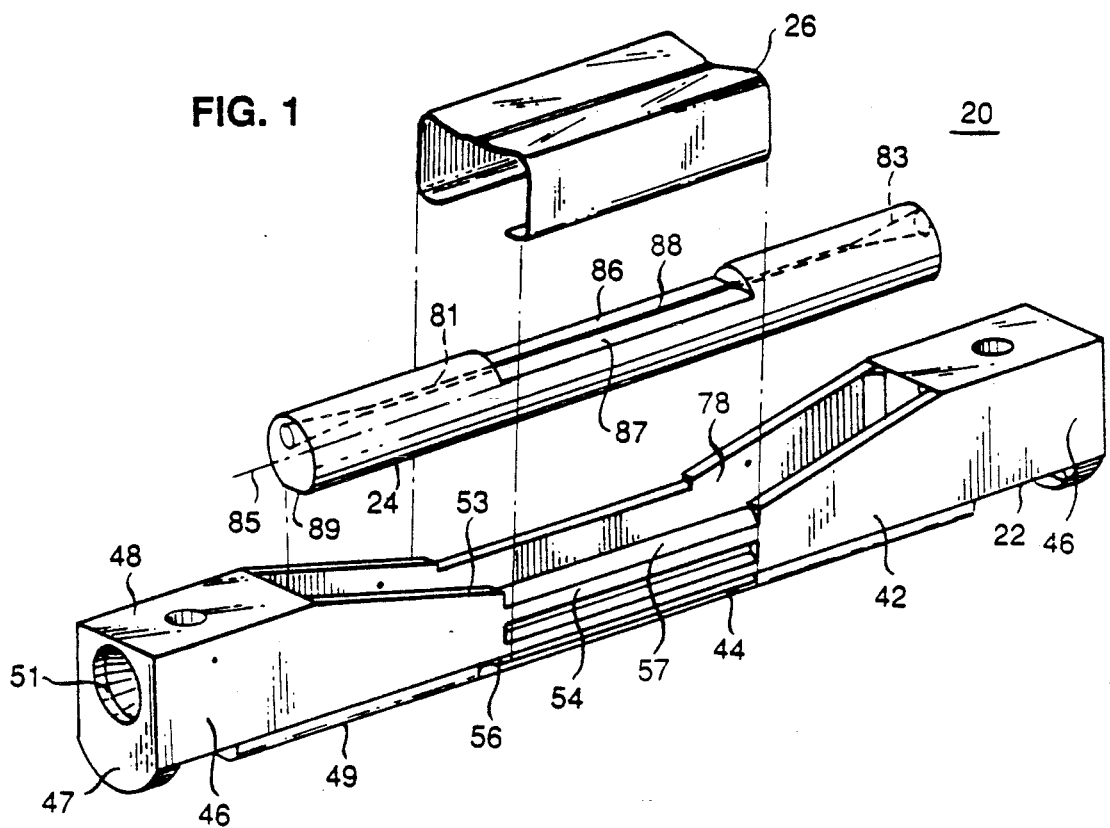
FIG. 1 is an exploded perspective view of an optical fiber splicing device of this invention which includes a housing, a slotted capillary tube and a spring clamp.
Figure 2:
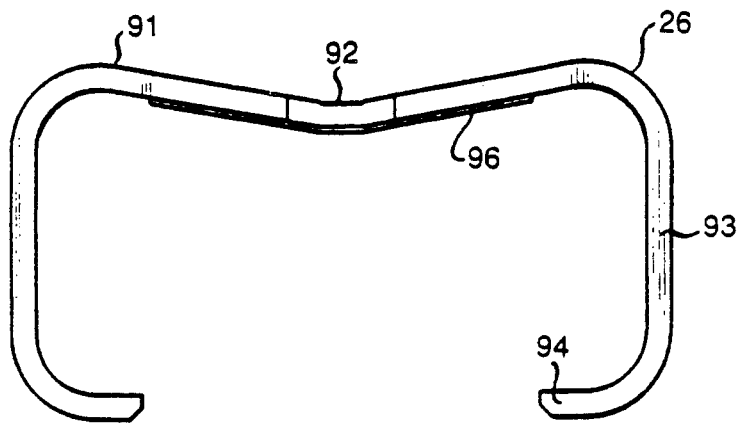
FIG. 2 is an end view of the spring clamp of FIG. 1.

Referring now to FIG. 1 there is shown an optical fiber splicing device which is designated generally by the numeral 20. The optical fiber splicing device 20 includes a housing designated generally by the numeral 22, a capillary tube member designated generally by the numeral 24 and a clamping member designated generally by the numeral 26 (see also FIGS. 2 and 3). The optical fiber splicing device 20 is adapted to provide a splice connection between two optical fibers 30—30 (see FIG. 4).

End portions 32—32 of the two optical fibers 30—30 are caused to be held in butted relationship to provide a splice connection therebetween. As is well known, each of the optical fibers 30—30 includes a glass core and a glass cladding. In order to protect the optical fiber, one or more coatings typically enclose the cladding.

Referring again to FIG. 1, it can be seen that the housing 22 is elongated and includes opposed end portions 42—42 with a center portion 44 therebetween. The housing 22 is made of a transparent plastic material which in a preferred embodiment is polysulfone. Each of the end portions 42—42 includes two sides 46—46, an end 47, a top 48 and a bottom portion 49. As can be seen best in FIG. 1, the top 48 extends along only a portion of the sides 46—46 after which the sides are tapered (see also FIGS. 3-4) from the top to the center portion 44. Each end 47 includes an opening 51 which is adapted to receive the end portion of an optical fiber to be spliced. It is not necessary that the bottom 49 extend to the end 47 and instead may be spaced therefrom as shown in FIG. 4.

The center portion 44 of the housing 22 extends between ends 53—53 of the tapered portions of the sides 46—46. The center portion 44 includes two sides 54—54 and a bottom 56. The sides 54—54 of the center portion 44 are integral with the sides 46—46 of the two end portions 42—42. As is seen in FIG. 1, the center portion 44 is formed with a wedge-shaped free longitudinal edge portion 57 having an outer inclined surface 58 (see also FIG. 5). The outer inclined edge surface 58 is connected to a surface 59 which appears vertical in FIG. 5. The surface 59 is undercut along a portion 61 to provide a latching portion which connects to a longitudinally extending surface 62 which also appears oriented vertically in FIG. 5. The surface 62 joins to a a camming surface 63 which at its outermost point is connected to another vertical surface 64. The vertical surface 64 falls off at another undercut, latching portion 66. The bottom 56 of at least the center portion 44 is provided with a radiused portion 67 (see FIG. 5).

Figure 4:
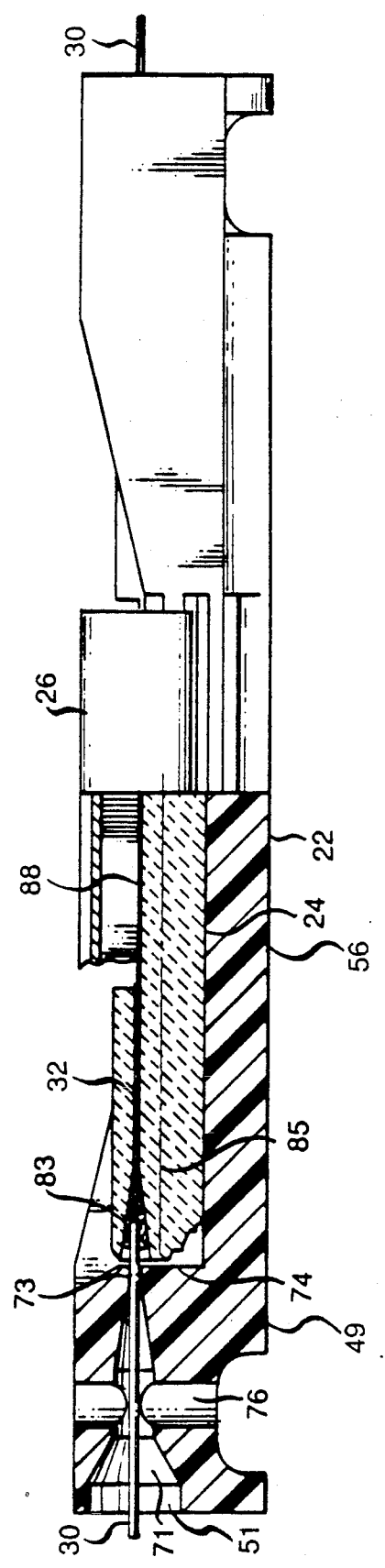
FIG. 4 is an elevational view partially in section of the assembly of FIG. 3.

Viewing again FIG. 4, it can be seen that the opening 51 in each end 47 of the housing 22 communicates with a channel 71 which tapers inwardly. The channel 71 extends through a transition portion 73 to an outer surface of an end wall 74. The channel 71 is interrupted by a cross-channel 76 which may be used to introduce an index-matching material into the channel 71.

As can be seen in FIG. 1, the sides, bottoms and tops of the housing 22 and the end walls 74—74 define a cavity 78. The cavity extends from a juncture between the top 48 at one end and the adjacent tapered side portions to the juncture of the top 48 at the opposite end to the tapered side portions (see also FIG. 4).

Adapted to be received in the cavity 78 formed within the housing 22 is the capillary tube member 24 (see FIGS. 1, 3, 4 and 5). Preferably the capillary member 24 is made of transparent glass and has a passageway 81 extending therethrough. The passageway 81 is adapted to receive end portions of two optical fibers to be spliced. Further, each outer end portion of the passageway 81 of the glass capillary tube member 24 is provided with a flared portion 83 to facilitate the insertion of an end portion of an optical fiber 30 into the passageway. It should be observed that the longitudinally extending passageway 81 is formed eccentrically with respect to a longitudinal centerline axis 85 of the capillary tube member.

The capillary tube member 24 is provided with a slot 86 which is disposed centrally. In keeping with this structure, the capillary tube member 24 often is referred to as a slotted capillary tube. The slot 86 extends inwardly to an extent such that a groove 88 comprising about half the cross section of the passageway 81 is formed in a planar chordal portion 87 of the slotted portion (see FIGS. 1 and 5). As can be seen in FIG. 5, the slot 86 is formed to remove a portion of the capillary tube member 24 through which the longitudinal centerline axis 85 does not extend. In this way, that portion of the capillary tube member 24 which remains after the slot has been cut has enhanced strength over that which would be provided if the groove and chordal portion were along the centerline axis.

Also, as can be seen best in FIG. 5, the capillary tube member 24 is formed with a flat 89 diametrically opposite to the slotted portion. When the slotted capillary member 24 is disposed within the cavity 78 of the housing 22, the flat 89 is adapted to seat in engagement with an inner surface 95 of the bottom portions 49 and 56 of the end portions 42—42 and of the center portion 44, respectively (see FIG. 5). Also, it should be observed from FIG. 5, that when the slotted capillary tube member 24 is seated within the housing 22, the planar portion 87 is spaced slightly above the wedge shaped portions 57—57 of the center portion 44. Further, the length of the slotted portion 86 of the capillary member 24 is coextensive with the length of the center portion 44 of the housing 22.

Disposed along the glass-plastic interface between the outer peripheral surface of the capillary member 24 and arcuately shaped inner walls 90—90 of the side members of the end portions 42—42 and of the center portion of the housing 22 is a grease-like index matching material. The radius of the portion 67 which is made of polysulfone, for example, is such that the bottom of at least the center portion cooperates with the partially circular cross-section capillary tube member 24 to provide a lensing effect. As such, the end portions 32—32 of the optical fibers 30—30 in the vicinity of the splice are magnified. This allows a craftsperson to be able to view the interior of the housing 22 and more particularly the area of the splice connection. But for the index-matching materials, air would occupy the interface and interfere with the visual inspection of the splice.

The clamping member 26 (see FIGS. 1 and 2) is adapted to span across the slotted portion 86 of the capillary tube member 24 to maintain the exposed end portions of the optical fibers 30—30 in butted alignment with each other. In a preferred embodiment, the clamping member 26 is an energy storage device such as a spring member which is made of a metallic material, such as, for example, spring steel. The clamping member 26 comprises a clamping portion 91 having a depressed center portion 92 and two lateral portions 93—93. From the end of each lateral portion 93 extends inwardly a toothed portion 94. Also, an underside center portion of the clamping portion 91 is provided with a strip 96 of a compliant material.

As shipped from a manufacturer, the splicing device 20 appears as is shown in FIGS. 3, 4 and 5. The slotted capillary member 24 is disposed within the cavity 78 in the housing 22. With the flat 89 of the capillary member 24 engaging the bottom 95 of the housing 22, the flared entrance 83 at each end of the capillary member becomes aligned with the exit of the adjacent transition portion 73 of the channel 71. Also, as can be seen, the clamping member 26 is mounted on the housing in an armed, first position with the toothed portions 94—94 in engagement with the undercut portions 61—61 (see also FIG. 5) of the center portion 44 of the housing 22. In this position, the clamping member 26 is in an armed position with the clamping portion 91 spanning across the planar portion 87 and spaced therefrom.

In use of the optical fiber splicing device 20 of this invention, the end portion of each optical fiber 30 to be spliced is stripped of its coating or coatings. Typically, this results in exposed end portions 32—32 of the optical fibers 30—30 each having an outer diameter of about 125 microns. Then a craftsperson cleaves the end of the end portion 32 of each optical fiber 30.

Afterwards, the craftsperson inserts the stripped end portion 32 of one of the optical fibers 30 into one of the openings 51—51 and the other end portion into the other opposite opening. The craftsperson applies forces to each optical fiber end portion 32 to move it through its associated channel 71 and into an aligned flared opening 83 in the capillary member 24. The stripping is accomplished such that when the end of the stripped portion of the fiber 30 is aligned with the inner end of the flared entrance portion 83, the cleaved end of the fiber is substantially at the transverse center of the capillary member 24. Accordingly, when both optical fibers 30—30 have been inserted, the cleaved ends should abut each other generally at the center of the capillary member 24.

The insertion of the end portions 32—32 of the optical fibers 30—30 is carried out in the presence of an index matching grease-like material which is available commerically. The index matching material is preinserted into the passageway 81 in the capillary tube member 24. Also, as will be recalled, it may be preinserted, for example, into the cross-channels 76—76. The insertion of the end portions drags and pushes some of the grease-like material through a circular portion of the passageway 81 toward the semi-circular, grooved portion 88 of the passageway in the center, slotted portion 86 of the capillary tube member 24.

Figure 7:
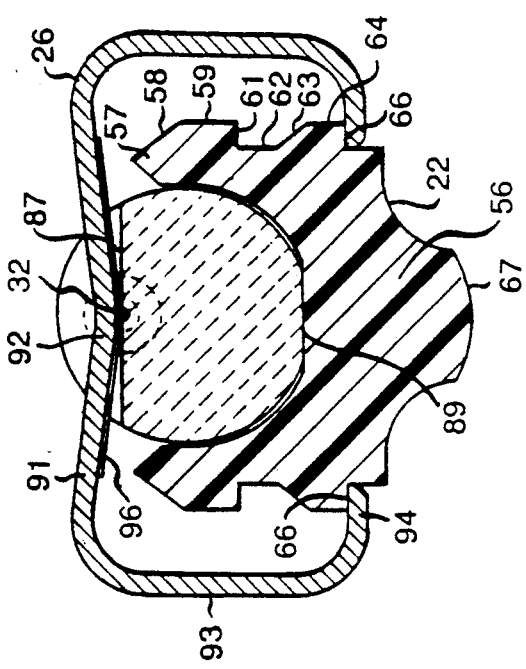
FIG. 7 is an end view in section of the optical fiber splicing device of FIG. 6 with the spring clamp thereof in a closed position.
Figure 6:
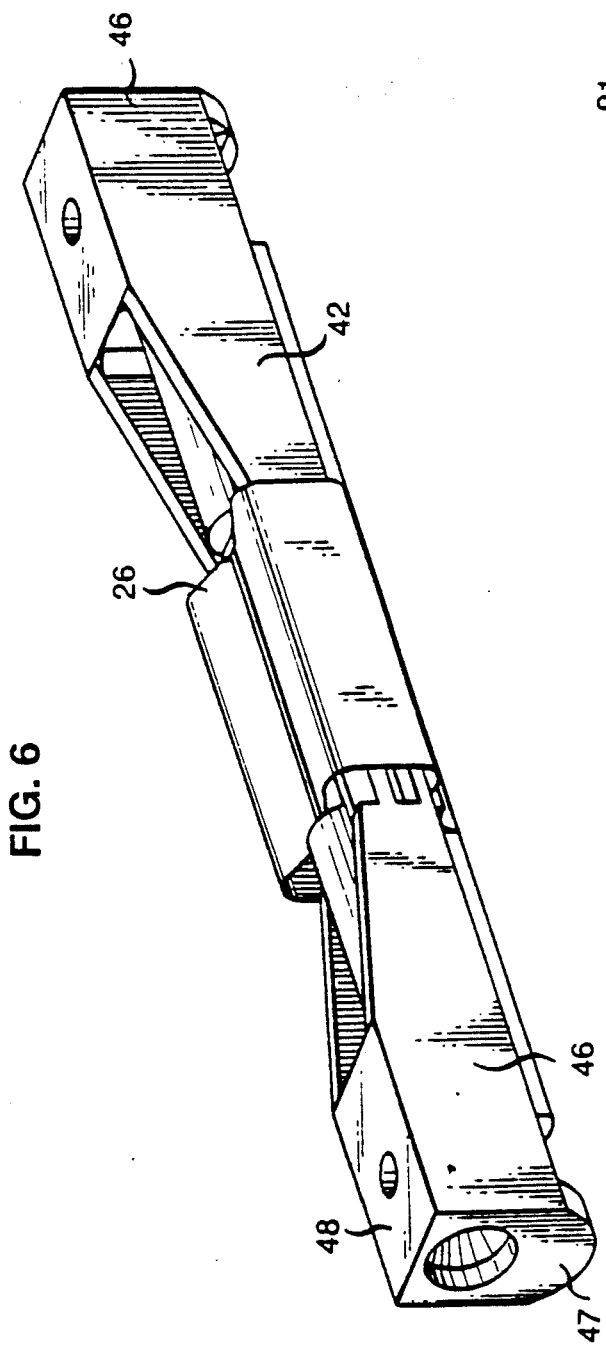
FIG. 6 is a perspective view of the optical fiber splicing device of FIG. 1 as assembled with the spring clamp thereof in a closed position.

With the fiber end portions 32—32 inserted to abut the cleaved fiber ends and the clamping member 26 in its armed position, the splicing device 20 is ready for the final step. The craftsperson causes the clamping member 26 to be moved to a clamping, second position as shown in FIGS. 6 and 7. As the craftsperson applies downwardly directed forces to the clamping member 26 (as viewed in FIG. 5), the toothed portions 94—94 ride downwardly along the vertical surfaces 62—62 and then are cammed outwardly along the camming portions 63—63 until they engage the vertical surfaces 64—64. Further movement causes the toothed portions 94—94 to clear the lower ends of the surfaces 64—64 and snap-lock under the latching surfaces 66—66. This secures the clamping member 26 in engagement with the housing 22.

When the clamping member 26 is secured to the housing 22, as shown in FIGS. 6 and 7, the strip 96 of compliant material secured to an underside of the depressed center portion 92 of the clamping portion 91 engages the stripped fiber end portions in the semicircular portion 88 of the passageway 81 which opens to the planar surface 87. This causes the stripped, butted end portions of the optical fibers to be held in alignment as can be viewed through the radiused lens portion 67 of the housing 22 from its underside.

It is to be understood that the above-described arrangements are simply illustrative of the invention. Other arrangements may be devised by those skilled in the art which will embody the principles of the invention and fall within the spirit and scope thereof.

We claim:

1. An optical fiber splicing device, which comprises:
   a housing;
   a unipartite capillary tube member being disposed in said housing and having a longitudinal centerline axis and a passageway formed in end portions thereof for holding portions of optical fibers to be spliced with said passageway being formed parallel to said longitudinal centerline axis, said capillary tube member having a slot formed between the end portions thereof to form a planar surface which in a plane normal to said longitudinal centerline axis appears as a chord of a transverse cross section of said capillary tube, said planar surface having a groove being formed therein parallel to and communicating with the passageways in said end portions of said capillary tube member and being adapted to hold end portions of the portions of the optical fibers to be spliced; and
   clamping means being mounted on said housing and adapted to be disposed in an open first position with respect to said capillary tube member in which position said clamping means is spaced from the end portions of the fibers which become disposed in said groove along said planar surface and adapted to be moved to a second position in which it is secured in clamping engagement with the end portions of the fibers disposed in said groove.

2. The optical fiber splicing device of claim 1, wherein said housing includes a cavity in which is disposed said capillary tube member, said housing including means engageable with said energy storage means to hold said energy storage means secured in clamping engagement with the fiber end portions.

3. The optical fiber splicing device of claim 2, wherein said housing includes a center portion having a radiused portion which is formed opposite to said groove, which is aligned with the ends of the fiber end portions and which is arranged to cooperate with the configuration of said capillary tube member to facilitate visual inspection of the vicinity of the splice.

4. The optical fiber splicing device of claim 1, wherein said capillary tube member is cylindrically shaped, wherein said passageway is formed eccentrically with respect to said longitudinal centerline axis and wherein said slot is formed such that in a transverse cross section of said capillary tube member which is normal to the longitudinal centerline axis, the portion of said capillary tube member remaining after said slot has been formed is more than half the area of the cross section and is defined by a portion of a circle which is greater than half the circumference of the transverse cross section and a chord which is less in length than an outer diameter of said capillary tube member.

5. The optical fiber splicing device of claim 1, wherein said energy storage means comprises a spring clamp having a generally U-shape and comprising two lateral portions joined by a clamping portion.

6. The optical fiber splicing device of claim 5, wherein said clamping portion includes a depressed central portion which when said spring clamp is disposed in said second position is adapted to apply compressive forces to the exposed end portions of the optical fibers in the slotted portion of said capillary tube member.

7. The optical fiber splicing device of claim 6, wherein each of said lateral portions of said spring clamp includes an inwardly directed toothed portion adapted to engage a first latching portion of said housing to hold said spring clamp secured to said housing during the insertion into said capillary tube member of end portions of optical fibers to be spliced.

8. The optical fiber splicing device of claim 7, wherein said housing also includes camming portions being formed along said center portion thereof and being adapted upon the application of forces to said spring clamp in said first position to cause each said toothed portion to ride along one of said camming portions and be cammed outwardly and toward a second latching portion whereupon said toothed portions snap-lock into latching engagement with said second latching portions to hold said depressed portion in clamping engagement with exposed portions of the optical fibers being spliced.

9. The optical fiber splicing device of claim 8, wherein an underside of the central portion of said spring clamp is provided with a compliant material which engages the exposed portions of the optical fibers in said groove when said spring clamp is in the second position.

10. The optical fiber splicing device of claim 9, wherein said passageway in said capillary tube member is interrupted by said slot such that said slot includes a planar portion with a portion of said passageway extending as said groove along said planar portion to receive the exposed end portions of optical fibers to be spliced.

11. The optical fiber splicing device of claim 10, wherein said capillary tube member includes a flared entrance portion at each end which opens to said passageway.

12. The optical fiber splicing device of claim 11, wherein said slot in said capillary tube member is such that the groove along a center portion of said capillary tube member has a generally semi-circular transverse cross section.

13. The optical fiber connector of claim 12, wherein each end of said housing includes a tapered channel which communicates with a flared opening in said end wall of said housing and with the cavity of said housing in which is disposed said capillary tube member.

14. Spliced optical fiber transmission media, which includes:
   a first optical fiber transmission medium;
   a second optical fiber transmission medium having an end portion which is spliced to an end portion of said first transmission medium; and
   an optical fiber splicing device which includes:
      a unipartite capillary tube member having a longitudinal centerline axis and a passageway formed in end portions thereof for holding portions of the spliced first and second optical fibers with said passageway being formed parallel to said longitudinal centerline axis, said capillary tube member having a slot formed between the end portions thereof to form a planar surface which in a plane normal to said longitudinal centerline axis appears as a chord of a transverse cross section of said capillary tube, said planar surface having a groove being formed therein parallel to and communicating with the passageways in said end portions of said capillary tube member and holding end portions of the portions of the spliced first and second optical fibers; and clamping means which is capable of being mounted in an open first position with respect to said capillary tube member in which position said clamping means is spaced from the groove to allow end portions of the fibers to be spliced to become disposed in said groove along said planar surface and which is disposed in a second position in which it is secured in clamping engagement with the end portions of the fibers disposed in said groove.

15. The spliced optical transmission media of claim 14, wherein said splicing device includes a housing having a cavity in which is disposed said capillary tube member, said housing including means engageable with said energy storage means to hold said energy storage means secured in clamping engagement with the fiber end portions.

16. The spliced optical transmission media of claim 15, wherein said housing includes a center portion having a radiused portion which is formed opposite to said groove, which is aligned with the ends of the fiber end portions and which is arranged to cooperate with the configuration of said capillary tube member to facilitate visual inspection of the vicinity of the splice.

17. The spliced optical transmission media of claim 16, wherein said capillary tube member is cylindrically shaped, wherein said passageway is formed eccentrically with respect to said longitudinal centerline axis and wherein said slot is formed such that in a transverse cross-section of said capillary tube member which is normal to the longitudinal centerline axis, the portion of the capillary tube member remaining after said slot has been formed is more than half the area of the cross-section and is defined by a portion of a circle which is greater than half the circumference of the transverse cross section and a chord which is less in length than an outer diameter of said capillary tube member.

18. The spliced optical fiber transmission media of claim 14, wherein said energy storage means includes a spring clamp comprising two lateral portions joined by a clamping portion and wherein said clamping portion includes a depressed central portion which with said spring clamp disposed in said second position applies compressive forces to the exposed end portions of the optical fibers in the slotted portion of said capillary tube member.

19. The spliced optical fiber transmission media of claim 18, wherein each of said lateral portions of said spring clamp includes an inwardly directed toothed portion adapted to engage a first latching portion of said housing to hold said spring clamp secured to said housing during the insertion into said capillary tube member of end portions of optical fibers to be spliced.

* * * * *